UNITED STATES PATENT OFFICE.

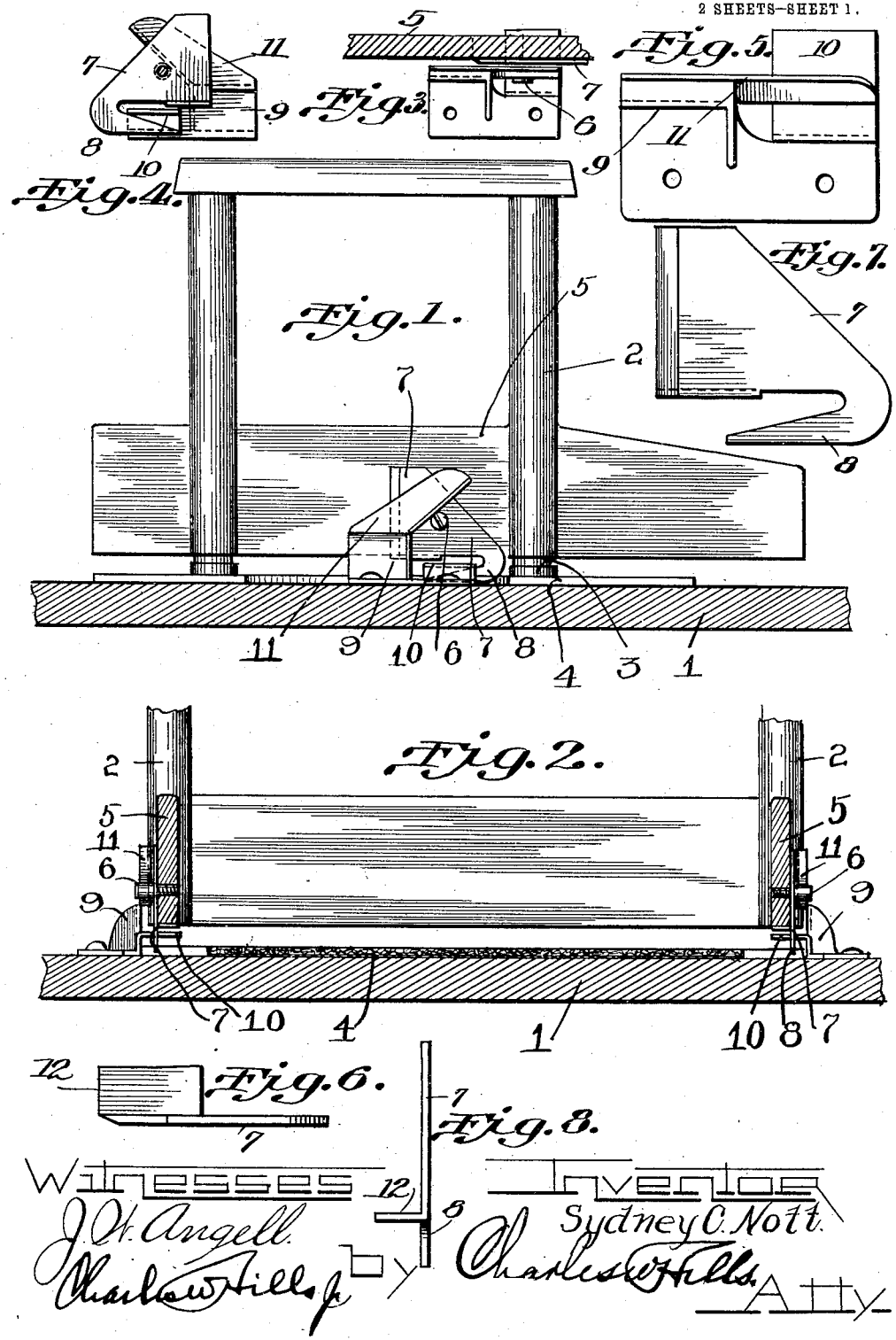

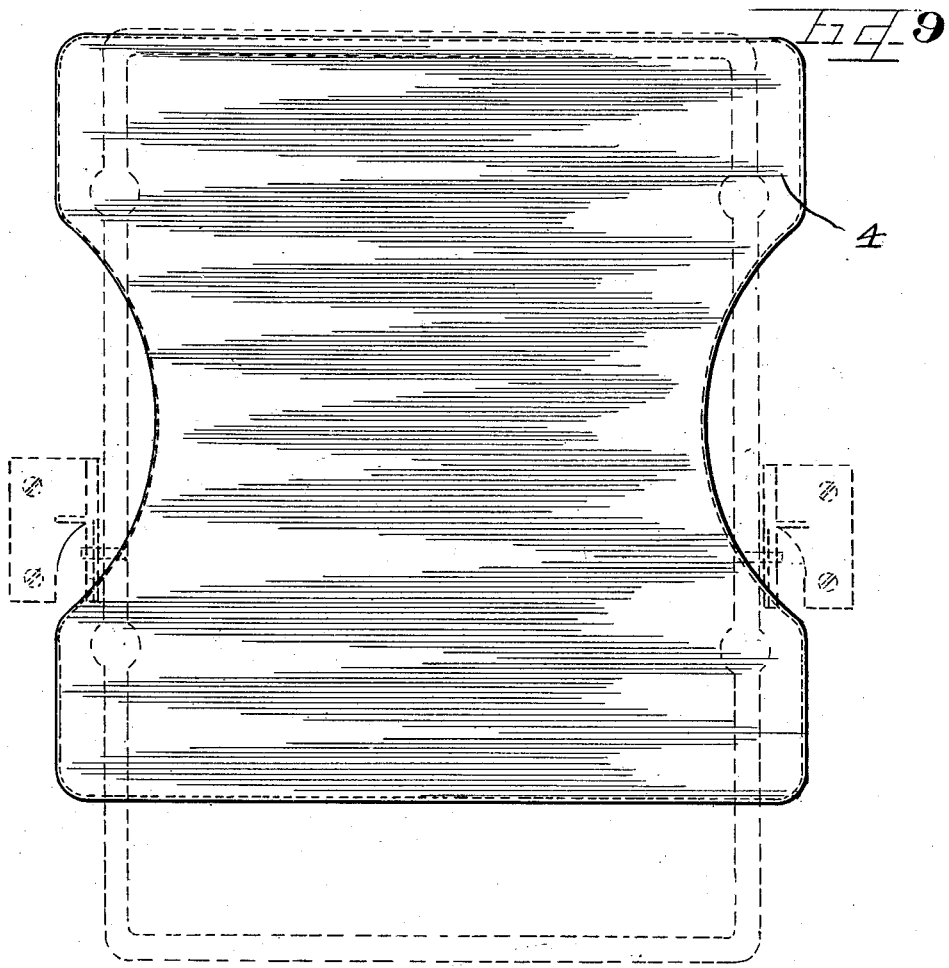

SYDNEY C. NOTT, OF LA GRANGE, ILLINOIS.

ATTACHING MEANS FOR TYPE-WRITERS AND THE LIKE.

1,119,108.      Specification of Letters Patent.      Patented Dec. 1, 1914.

Application filed August 8, 1910. Serial No. 576,115.

*To all whom it may concern:*

Be it known that I, SYDNEY C. NOTT, a citizen of the United States, and a resident of the town of La Grange, in the county of Cook and State of Illinois, have invented certain new and useful Improvements in Attaching Means for Type-Writers and the like; and I do hereby declare that the following is a full, clear, and exact description of the same, reference being had to the accompanying drawings, and to the numbers of reference marked thereon, which form a part of this specification.

The various kinds of typewriters and machines of a similar nature have heretofore been secured upon the typewriter (or other) desk, usually by providing apertures in the desk top bed or base or slide board and engaging attaching bolts therethrough to hold the typewriter (or other machine) in place. In some instances, rigid clamps have been screwed in place to permanently and rigidly attach the machine to its support to hold the same when the desk is closed and to prevent the typewriter falling back into the desk when closing. Such clamps or bolts, of course, so fix or secure the machine to the desk as to prevent movement of the machine thereon without first unscrewing the releasing clamp.

It is objectionable to firmly fix or position the typewriter or like machine on the desk for the reason that expert operators dislike to reduce the responsive action of the machine in this manner and find it much more convenient as well as restful to slide the machine forward when in use to enable the operator to change his position at the desk from time to time while using the machine. Although several attempts have been made in the past to provide attaching means permitting such adjustment or movement of the machine, they have usually proved unreliable and should the operator forget to again secure his machine in the clamps before closing his desk, injury to the machine is almost certain to result.

It is an object of this invention to provide means adaptable for use with typewriters of any make or kind whereby the machine is at all times protected from injury in closing the desk, although freely movable transversely the desk by the operator.

It is also an object of the invention to afford a clamp which, although occupying small space both on the desk and on the machine, is so constructed as to automatically engage and hold the typewriter when closing the desk.

It is further an object of the invention to afford in connection with a typewriter or the like a clamping means therefor, permitting free forward movement of the machine and a freely slidable resilient pad or support, which acts as a silencer for the machine and absorbs considerable portion of the shock upon the keys due to rapid operation and which, because of the slight friction exerted between the same and the support, permits the machine to slide therewith into engagement with the clamps when closing the desk.

It is also an object of the invention to afford a device of the class described of exceedingly cheap, simple and durable construction and occupying exceedingly small space upon the desk and machine.

In the particular embodiment of my invention illustrated in the drawings:—Figure 1 is a side elevation of a device embodying my invention, illustrating the typewriting (or other) machine diagrammatically. Fig. 2 is a vertical section taken through the side rails of the attaching means, in elevation. Fig. 3 is a fragmentary top plan view of a device embodying my invention, showing the side rail of the machine in section. Fig. 4 is a vertical section taken between the clamping plate and the typewriting machine. Fig. 5 is an enlarged top plan view of the bracket. Fig. 6 is an enlarged top plan view of the clamping plate. Fig. 7 is an enlarged side elevation of the clamping plate. Fig. 8 is an enlarged rear elevation thereof. Fig. 9 is a plan view of the pad, showing the machine and clamps in dotted lines.

As shown in the drawings: 1, indicates the support or bed and 2, indicates a typewriter or analogous machine, the feet 3, of which are supported upon a resilient pad 4, such as cork carpet, felt, or other suitable material which is treated, coated, or lined on the under side to afford a surface capable of producing but very little friction when slid on the support. Secured on the side frame rail 5, of the machine by means of a screw 6, having an elongated and outwardly protruding head, is a clamping plate 7, the forward lower edge of which extends below the side rail 5, and is provided with a rearwardly directed inclined finger 8, which extends in close proximity with the support.

Rigidly screwed on the support on each side of the machine is a bracket 9, a portion of the base of which is struck up to afford a tongue 10, extending transversely beneath the side rail 5, of the machine and at a height to permit engagement of the hook or finger 8, of the clamping plate 7, therebeneath when the machine is slid rearwardly on the support. Above the base, said bracket extends upwardly and forwardly, providing a forwardly directed hook 11, which lies in close proximity with the side rail of the machine and clamping plate 7, and beneath the forwardly directed inclined face of which the elongated head of the screw 6, engages when the machine is slid rearwardly.

The operation is as follows: The machine is positioned upon the support therefor and on the pad at a point permitting full closure of the desk top and with the clamping plate 7, secured on the sides of the machine by means of the screw 6, as before described and with the flange 12, extending beneath the rail near the rear corner of the plate. The brackets are next screwed to the support, one on each side of the machine and with the upwardly and forwardly hooked end thereof in close proximity with the side rail and clamping plate and in position to simultaneously engage the head of the elongated screw or any other suitable projection on the clamping plate, and also for the finger 8, to engage beneath the flange or tongue 10, of the bracket when the machine slides rearwardly with its pad, thereby affording a double lock.

The operator may obviously draw the machine forward to any desired extent for convenience in operation. Should he forget to return the machine to normal position for closing the desk, the pad slides rearwardly by gravity when the support is sufficiently inclined carrying the machine therewith, until the projections on the clamping plates engage the brackets. The upwardly directed hooks 11, of the brackets serve as guides one on each side the machine, directing the machine accurately on the support to bring the engaging parts on the clamps and brackets into locking engagement.

Of course, it is obvious that instead of engaging the projecting ends of the screws whereby the clamping plates are secured to the side rails of the machine, the forwardly directed hooks may engage any suitable projection on the clamping plate or machine, as, for instance, a flange turned outwardly for that purpose and obviously any suitable guide may be provided to direct the machine rearwardly into engaging position and the tongues 8, only may afford the locking engagement.

I have shown but one of several convenient constructions embodying my invention, and I therefore do not purpose limiting this application for patent otherwise than necessitated by the prior art.

I claim as my invention:

1. Attaching means of the class described embracing a flat hook plate, a projecting screw securing the same, a flange on one edge of said plate to prevent movement about said screw, a bracket comprising a face plate for attachment, an upright guide member integral therewith, an inturned flange thereon adapted to be engaged by said hook plate and an angled face on said upright adapted to engage over said screw.

2. Complementary attaching means for typewriters comprising two hook complements, the one secured by a projecting screw, a flange member on the other, said complements adapted to interlock with a unidirected movement, the one hook over said screw the other hook over said flange and the reverse movement affording disengagement of the two complements.

3. Complemental securing means for typewriters and the like comprising two plate members, oppositely directed hooks on each in substantially parallel relation, a projecting screw affording attachment for one complement and a flange on the other, said hooks adapted to simultaneously engage said screw and flange respectively with a unidirected movement toward one another.

4. In a device of the class described, a clamp, a tapered hook thereon, a projecting screw affording means of attachment for the clamp, a flange on said clamp adapted to prevent rotation of the same about the screw, a bracket, a flange thereon adapted to engage over said hook, an angled projection adapted to bear against said screw and together therewith afford a double lock.

5. In a device of the class described attaching means for machines of the class described embracing a plate, one on each side of the machine, means projecting from each of said plates, a flange extending along the lower edge of said plates, a tapered hook extending below said edge, a bracket secured to a support, one on each side of the machine adapted to guide the same, a horizontal flange on said bracket adapted to engage over said hook, and means adapted to bear on said projecting means and afford a double lock thereby.

In testimony whereof I have hereunto subscribed my name in the presence of two subscribing witnesses.

SYDNEY C. NOTT.

Witnesses:
CHARLES W. HILLS, Jr.,
WILLIAM C. ATKINSON.

Copies of this patent may be obtained for five cents each, by addressing the "Commissioner of Patents, Washington, D. C."